United States Patent [19]
Teo

[11] Patent Number: 5,628,320
[45] Date of Patent: May 13, 1997

[54] ULTRASOUND IMAGE RECONSTRUCTION USING BACK-PROPAGATION

[75] Inventor: Tat-Jin Teo, Redmond, Wash.

[73] Assignee: Siemens Medical Systems, Inc., Iselin, N.J.

[21] Appl. No.: 625,187

[22] Filed: Mar. 29, 1996

[51] Int. Cl.$^6$ ................................................. A61B 8/00
[52] U.S. Cl. ................................. 128/660.07; 128/916
[58] Field of Search ...................... 128/660.07, 661.01, 128/661.02, 661.09, 916; 73/602, 625–626; 364/413.25; 367/7

[56] References Cited

U.S. PATENT DOCUMENTS

| | | | |
|---|---|---|---|
| 4,688,430 | 8/1987 | Anderson | 73/625 |
| 4,706,499 | 11/1987 | Anderson | 73/625 |
| 4,817,434 | 4/1989 | Anderson | 73/625 |
| 4,866,614 | 9/1989 | Tam | 364/413.25 |
| 5,005,418 | 4/1991 | Anderson | 73/625 |
| 5,031,154 | 7/1991 | Watanabe | 367/8 |
| 5,090,245 | 2/1992 | Anderson | 73/625 |
| 5,134,884 | 8/1992 | Anderson | 73/625 |
| 5,235,857 | 8/1993 | Anderson | 73/625 |

OTHER PUBLICATIONS

Forrest Anderson and Felix Morgan, "Active Imaging Analysis Via Ellipsoidal Projections", *Impulse Imaging Corporation*, pp. 1–12 (date unknown).

Joseph W. Goodman, "Introduction to Fourier Optics", *McGraw-Hill*, pp. 49–55, 1988.

*Primary Examiner*—Francis Jaworski
*Attorney, Agent, or Firm*—Jeffrey Slusher

[57] ABSTRACT

An image of an interrogation region of a patient's body is generated from the return signal from an ultrasound pulse, which is directed into the interrogation region by a transducer array, which may be linear (to create a planar image) or planar (to create a 3-D image). The time-domain signal back-scattered to the transducer is sensed at a reference plane (preferably, the transducer plane itself) and is transformed first by a temporal Fourier transform and then by a spatial Fourier transform, in order to generate an angular spectral decomposition of the back-scattered signal. This decomposed reference signal is then propagated to image planes (or lines) at depths other than at the reference plane, throughout the image volume. The resulting propagated signals are then inversely transformed twice, back into the time domain. An entire image is thus reconstructed from the back-propagated signal from a single input pulse. Alternatively, several pulses can be transmitted into the interrogation region, an image can be reconstructed from each, and the reconstructed images can be registered and averaged to improve the resulting image. Increases in speed of image generation of several orders of magnitude are often possible, since the system can generate an entire image after only one round-trip propagation time for the ultrasonic input signal.

10 Claims, 2 Drawing Sheets

ULTRASOUND IMAGE RECONSTRUCTION USING BACK-PROPAGATION

BACKGROUND OF THE INVENTION

1. Field of the Invention

This invention involves a system and a method for generating images of an interrogation region based on the echoes from ultrasonic signals transmitted into the region as a planar wavefield.

2. Description of the Related Art

In the area of diagnostic ultrasonic imaging, there is a never-ending effort to increase the resolution, speed, fidelity and affordability of the imaging system. It is in general not possible, however, to improve any one of these factors without worsening at least one of the others. Increases in the resolution and fidelity of the image, for example, often require expensive increases in the number of elements in the transducer array and time-consuming computational complexity in transmission and reception beamforming and in scan conversion.

Moreover, in certain instances, it is impossible to trade any of the other factors off to increase the frame-rate (one aspect of speed) of conventional systems. Assume, for example, that one wants to make the ultrasonic images appear more life-like and "real-time," so that one views the imaged interrogation region as a continuously changing display. One would at first possibly think simply to transmit more pulses into the interrogation region (usually, a portion of a patient's body) with shorter separation in time, that is, to send more pulses per second. The interrogation, however, is a physical system, and no matter how fast the system's processing circuitry is, it cannot reduce the time it takes for sound waves to propagate round-trip between the transducer and the portion of the patient's body being imaged.

For example, at a typical propagation velocity of around 1540 m/s, the round-trip time for an ultrasound pulse to and from a depth of 15 cm would be roughly 200μs. For imaging a volume, a typical frame is made up of on the order of 100 beams, while the column may be made up of on the order of 100 frames. The acquisition time for such a volume would thus take some 2 seconds, which is too long for most cardiac applications.

To reduce the possibility of erroneous signal interpretation due to overlapping (where a second signal is transmitted before the first has returned), one might use separate transducer elements to transmit and receive. This would mean, however, a reduction in achievable resolution for a transducer of any given physical size because not all elements would be used in the transmit and receive stages.

These necessary trade-offs are even more troublesome when it comes to three-dimensional imaging, since the computational burden and memory requirements increase exponentially with the dimension of the image. Using conventional technology, for example, a highly-complicated transmission (and reception) beamforming system may be needed to generate and analyze on the order of a hundred separate beams in order to image a three-dimensional region of a typical size. Beam generation is made even more complicated by the need to properly time, phase-shift, and weight the signals applied to each of the many transducer elements in order to focus the beam in the many regions used to make up the image. What is needed is therefore a way to generate ultrasonic images that is fast enough to create even three-dimensional images without undue hardware complexity and whose speed is less limited by the physical system being imaged.

SUMMARY OF THE INVENTION

According to the invention, an interrogation region of a patient's body is imaged using ultrasound by first generating a single pulse of ultrasound by activating a plurality of transducer elements in an ultrasound transducer and then directing the pulse into the interrogation region. At a reference plane, a time-domain reference return signal is sensed that includes back-scattered ultrasound from the interrogation region. The reference plane is preferably the plane of the transducer itself. An image of the entire interrogation region is then generated as a predetermined function of the reference return signal, and the image is then displayed.

In order to generate the image, the reference return signal is preferably transformed from the time-domain into the frequency domain (that is, it is decomposed into a frequency spectrum) as a frequency-domain reference signal. The values of each frequency component of the frequency-domain reference signal are then preferably decomposed into an angular spectrum, which forms a decomposed reference signal. The decomposed reference signal is then propagated to at least one additional plane other than the reference plane to form, for each additional plane, a respective decomposed propagated signal. Each decomposed propagated signal is then inverse transformed to form a corresponding frequency-domain propagated signal, which is in turn inverse transformed into the time domain as a corresponding time-domain propagated signal. Each time-domain propagated signal is then converted into a set of partial image values corresponding to their respective additional planes. The partial image values are then compiled into the image. A processing system is also disclosed that performs the various transformation and propagation steps.

In the preferred embodiment, the step of propagating the decomposed reference signal includes, for each additional plane, multiplying the decomposed reference signal by a predetermined function of the distance between the reference plane and the respective additional plane.

In order to improve the fidelity of the image, the system may also perform a plurality of times the steps of generating a pulse of ultrasound, sensing the time-domain reference return signal, and generating the image of the entire interrogation region. The different generated images are then averaged—after registration as needed—to form a composite image, which is then displayed.

The invention is well suited for quickly generating three-dimensional images. For such applications the ultrasound pulse is preferably a planar wave. All the transducer elements are therefore preferably activated uniformly, with no need for transmit beamforming.

DETAILED DESCRIPTION

Figure 1:
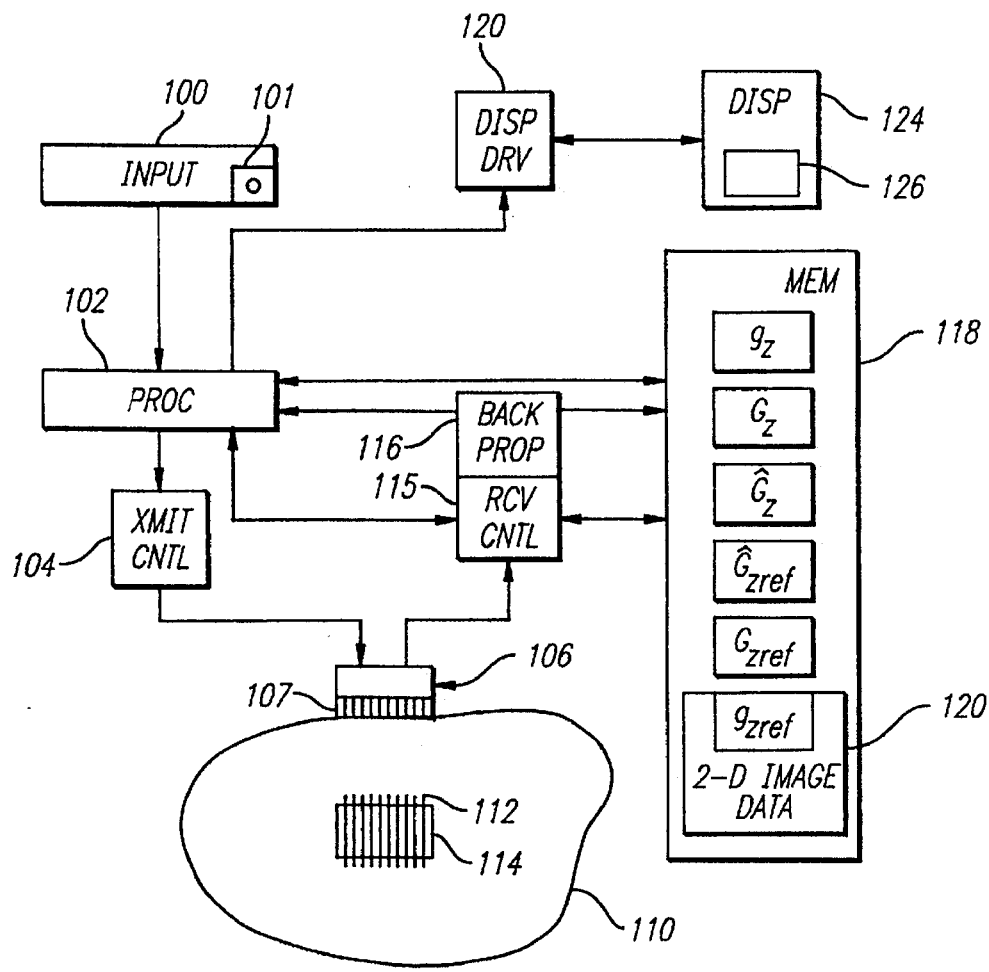
FIG. 1 is a block diagram of an ultrasonic imaging system with an identification and measuring processor and display according to the invention.

FIG. 1 illustrates the main components of an ultrasonic imaging system according to the invention. The user enters various conventional scan parameters into an input unit 100, which typically includes such devices as a keyboard, knobs, and buttons, and a cursor-control device such as a trackball 101 or mouse. The input unit is connected to a processing system 102, which will typically be an electrically connected and cooperating group of processors such as microprocessors and digital signal processors; the processing system may, however, also be implemented by a single processor as long as it is fast enough to handle the various tasks described below. As in known systems, the processing system 102 sets, adjusts, and monitors the operating parameters of a conventional transmission control circuit 104. The control circuit 104 generates and applies electrical control and driving signals to an ultrasonic probe 106, which includes an array 107 of n piezoelectric elements, for a linear array (for example, n=128 or n=256), or m×n elements for a two-dimensional array (for example, n=128 and m=64). As is well known in the art, the piezoelectric elements generate ultrasonic waves when electrical signals of the proper frequency are applied to them. In the following discussion, the individual transducer elements are labeled $117_1, 117_2, \ldots, 117_n$.

The invention is described below primarily with reference to an n-element linear array. This is merely for the sake of simplicity and ease of understanding. Extension of the invention's processing steps and associated hardware to applications of a 2-D, m×n-element array, may be made easily using known theoretical and design techniques. The invention is most advantageous for 2-D arrays, since they have greatest need for the increase in speed that the invention makes possible.

By placing the probe 106 against the body of a patient, the ultrasonic waves enter a portion or "interrogation region" 110 of the patient's body as a series of scan lines 112. In conventional ultrasound systems, the driving signals are generated (under the control of a transmission beamformer in the transmission controller 104) with the phasing, amplitude, and timing necessary to focus them into the interrogation region. To build up a three-dimensional image in conventional systems, it is then necessary to scan the interrogation region many times in order to compile and register enough image data to be able to create a three-dimensional image representation of an entire scan volume.

As is explained in greater detail below, although such transmission beamforming may be performed in the invention (in order to increase the signal-to-noise ratio), for most applications it will not be necessary at all. Rather, all the transducer elements in the invention can be activated uniformly, with equal energy to generate substantially parallel scan lines 112, with no need for special focussing, yet a complete representation of the scan volume can be generated. Indeed, in the ideal (or most high-speed) case, a single activation of the transducer elements will suffice to generate an entire 3-D image. Furthermore, the use of parallel beams (planar insonification) eliminates pointing error, which systems using focused beams suffer from. Several such scan lines 112 are shown extending into the patient's body in FIG. 1.

A region of interest, that is, the region that the user wants to have an image of, is shown as an interrogation region or volume 114. The manner in which ultrasonic scanning signals are controlled, generated, and applied to a patient's body is well understood in the art and is therefore not described further.

Ultrasonic echoes from the waves transmitted into the body return to the array 107 in the probe 106. As is well understood, the piezoelectric elements in the array convert the small mechanical vibrations caused by the echoes, that is, by the return signals, into corresponding radiofrequency (RF) electrical signals.

Amplification and other conventional signal conditioning is then applied to these RF signals by a reception controller 115. In conventional systems, this processing includes such known signal conditioning as time-gating and gain compensation, and diffraction compensation. In this invention, such conventional conditioning as amplification may be included as needed, but there is no need for separate diffraction compensation. Reconstruction beginning at the start of the interrogation region may be performed to reduce the amount of data that must be stored, but there is no need to time-gate signals from within the interrogation region itself. Moreover, one should note that the invention does not require receive beamforming. The type of conventional signal processing that is needed will in general depend on the particular implementation of the invention and can be chosen using known design methods.

According to the invention, the signals conditioned by the reception controller 115 are then applied to a back-propagation processor 116, which generates a series of transformed signals that are used to form images of 2-D "slices" throughout the entire 3-D interrogation volume using, in the preferred embodiment, the return echo signals from one or only a few transmission pulses. This is described in greater detail below. The back-propagation processor 116 and the reception controller 115 are shown connected in FIG. 1 since they may be combined into a single processing sub-system, depending on the type of processor(s) used to implement them.

Each frame of the image is represented and stored digitally in a memory 118 as 2-D image frame data as an array of acoustic power or intensity values for the image elements that make up the frame. As is explained further below, some—indeed most—of the frames may be "synthesized" by the back-propagation processor 116, but the data so created may be stored and displayed in the conventional manner.

The interrogation region is normally not in the same shape as what the user wants to see displayed, and even when it is, the digital acoustic intensity values that make up the frame data are normally not in a form suitable for driving a conventional gray-tone or color display directly. The acoustic intensity values for an image frame are therefore applied (via the processing system 102) to a display driving circuit 120, which converts the digital acoustic values into display intensity or brightness values that are suitable for use in driving a display device 124. The display device 124 typically includes a screen 126 (for example, LED or CRT) that is divided into an X-Y (or polar) matrix or pattern of picture elements ("pixels") that make up an image that the user can view and interpret.

The image is displayed as a pattern of image elements that correspond to the received intensities from corresponding portions of one 2-D frame of data from—or synthesized from—the interrogation region. Note that a displayed image element will often be made up of more than one pixel, but that this will depend on the relative resolutions of the scan and of the display. The invention does not require any particular relative resolution.

Figure 2:
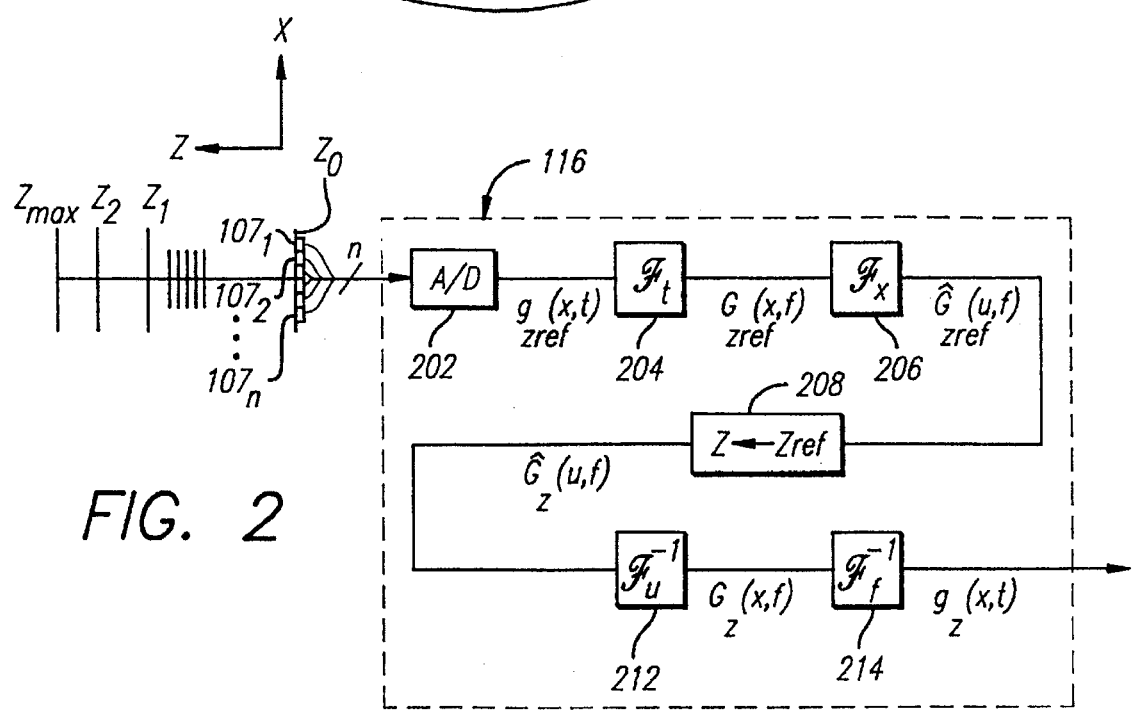
FIG. 2 is a block diagram that illustrates the main functional steps performed by a back-propagation processor in the invention.

FIG. 2 illustrates in block diagram form the main components and steps for back-propagation according to the invention. The user operates the transducer probe 106 (see FIG. 1) in the conventional manner, placing it against the patient's body and aiming it into the interrogation region. The processing system 102 and transmission controller 104 (see FIG. 1) then activate the transducer elements $117_1$, $117_2, \ldots, 117_n$ with uniform intensity to generate a single pulse of ultrasound made up of n parallel beams. This pulse enters the interrogation region as a substantially planar wave, which is indicated by the arrow 200, and by the parallel lines above the arrow. As is well known, the ultrasound reflects off of structures within the interrogation region and is back-scattered back to the transducer elements $117_1, 117_2, \ldots, 117_n$, which convert the acoustic energy back into electrical signals. The n return signals from the n elements are then passed on to the back-propagation processor 116 via the reception controller 115, which is not shown in FIG. 2 merely to avoid cluttering the figure with a feature whose function is not directly related to back-propagation.

In FIG. 2, the transducer elements $117_1, 117_2, \ldots, 117_n$ are shown extending in a lateral direction x, which is perpendicular to a depth direction z. For a 2-D array, separate elements would also lie out of the x-z plane and extend in a y direction, which would be orthogonal to the x and z axes. The planar waves from the transducer travel into the interrogation region in the z direction. The plane of the transducer elements is shown as lying at the origin of the illustrated x-z coordinate system, that is, at depth $z=z_0=0$.

The n return signals sensed from a region of interest (here, preferably the reference plane at $z=z_{ref}$) are continuous, time-domain signals, which are next converted into digital form using a conventional n-channel analog-to-digital (A/D) converter 202. The n digitized, time-domain return signals are designated $g_{zref}(x,t)$. The A/D converter 202 need not be part of the back-propagation processor 116 itself, but rather it may be included in the reception controller 115, or as a separate circuit. Note that, after A/D conversion, $g_{zref}(x,t)$ is made up of a discrete time-domain series of amplitude values for each of the n transducer elements (n×m, in the case of a 2-D array). In other words, $g_{zref}(X,t)=\{g_{zref}(x_1,t), g_{zref}(x_2,t), \ldots, g_{zref}(x_n, t)\}$; $t=t_1, t_2, \ldots, t_s$, where $t_1$ and $t_s$ are the beginning and end times of the sampling period for each signal. Note that the number s of sample values need not be equal to the number of transducer elements, and will often be much greater, especially for a linear array.

At this point, it is helpful to recall that the Fourier transform $\Im$ of a discrete function $h(\alpha)$ has the form:

$$\Im[x(\alpha)] = c \cdot \int_{-N/2}^{N/2} h(\alpha)\, e^{-2\Pi j \cdot f \cdot \alpha}\, d\alpha = H(f) \qquad \text{Equation 1}$$

where c is a scaling constant, N is the range of $\alpha$ over which $h(\alpha)$ is sampled, and f is frequency.

If the array is two-dimensional, such that transducer elements extend in both the x and y directions, then $h=h(\alpha, \beta)$, that is, a function of two variables, and Equation 1 can be extended as follows:

$$\Im[x(\alpha,\beta)] = c \cdot \int_{-N/2}^{N/2}\int_{-N/2}^{N/2} h(\alpha,\beta)\, e^{-2\Pi j \cdot (f\alpha\alpha + f\beta\beta)}\, d\alpha d\beta = H(f_\alpha, f_\beta) \qquad \text{Equation 2}$$

The corresponding inverse transformations are:

$$\Im^{-1}[x(\alpha)] = \frac{1}{c} \cdot \int_{-N/2}^{N/2} H(f)\, e^{+2\Pi j \cdot f \cdot \alpha}\, df = h(\alpha) \qquad \text{Equation 3}$$

$$\Im^{-1}[H(f_\alpha, f_\beta)] = \frac{1}{c} \cdot \int_{-N/2}^{N/2}\int_{-N/2}^{N/2} H(f_\alpha, f_\beta)\, e^{+2\Pi j \cdot (f\alpha\alpha + f\beta\beta)}\, df_\alpha df_\beta = h(\alpha,\beta) \qquad \text{Equation 4}$$

As is well known, the Fourier transform function is a (complex) frequency-domain decomposition of the original function; as the name implies, the inverse Fourier transform returns the transformed function to its original form. This is well known, and according to the invention, any known discrete Fourier transformation (and inverse Fourier transform) techniques and circuits may be applied to carry out the various needed Fourier transformations. What one should note, however, is that neither of the variables $\alpha$ and $\beta$ necessarily has to represent time—spatial functions (that is, $\alpha$ or $\beta$, or both, are both spatial variables) may, for example, be decomposed into frequency components just like temporal (time-domain) functions.

According to the invention, the signal $g_{zref}(x,t)$ for each of the n transducers elements is first transformed from the time domain to the frequency domain by an s-point time-domain Fourier transformation $(\Im_t)$ circuit 204, the output of which is the set of s (complex) frequency signals $G_{zref}(x,f)$. (Recall that s is the number of sample values of each time-domain signal $g_{zref}(x,t)$). Associated with each transducer element $177_i$ ($i=1, \ldots, n$), therefore, will be a set of s amplitude and phase values for each of s frequencies $f_1, f_2, \ldots, f_s$. More accurately, these values, for each transducer element, are stored in memory as frequency "bins" $bin_1, bin_2, \ldots, bin_s$, since the true, continuous spectrum is approximated as a discrete spectrum of frequencies—each frequency bin $b_i$ contains information about not only the value for each center frequency $f_i$, but also for other frequencies as well. As is well known, the accuracy of the discrete spectral representation, and thus the number of bins, is a function of how highly sampled the time-domain signal is.

At this point, there will be a set of s frequency bins for each of the n transducer elements. Thus, distributed spatially in the x-direction at $x=x_1, x_2, \ldots, x_n$ (and, for a 2-D array, in the y-direction as well at $y=y_1, y_2, \ldots, y_m$) there will be n (or nxm) different (complex) values for $bin_1$, for $bin_2$, and so on, up to $bin_s$, respectively.

Observe that grouping the s frequency components into respective bins is equivalent to a decomposition of the temporal signals into s single-frequency signals, each of which corresponds to a monochromatic planar wave. The n values in $bin_1$, for example, can be analyzed as a monochromatic planar wave whose frequency is $f_1$. The result of the temporal decomposition of the return signal to the frequency domain by the s-point time-domain Fourier transformation $(\Im_t)$ circuit 204, followed by grouping of same-frequency values into bins, is therefore equivalent to decomposing the return signal into a group of s monochromatic wave front, with respective frequencies $f_1, f_2, \ldots, fs_s$.

For each bin (each frequency), the n values of the frequency-domain signals $G_{zref}(x,f)$ are next transformed by an n-point spatial Fourier transformation $(\Im_x)$ circuit 206, the output of which is the set of n (complex) decomposition signals $\hat{G}_{zref}(u,f)$, where the variable u corresponds to the position of the transformed values in a spectral decomposition space (explained below). Spatial transformation, in the case of a linear array, means that the parameter $\alpha$ in Equation 1 is the spatial variable x. (Extension to two-dimensional arrays may be done in a known manner, according to Equation 2). The physical interpretation of spatial transformation of an already frequency-transformed time-domain signal is explained below.

Figure 3:
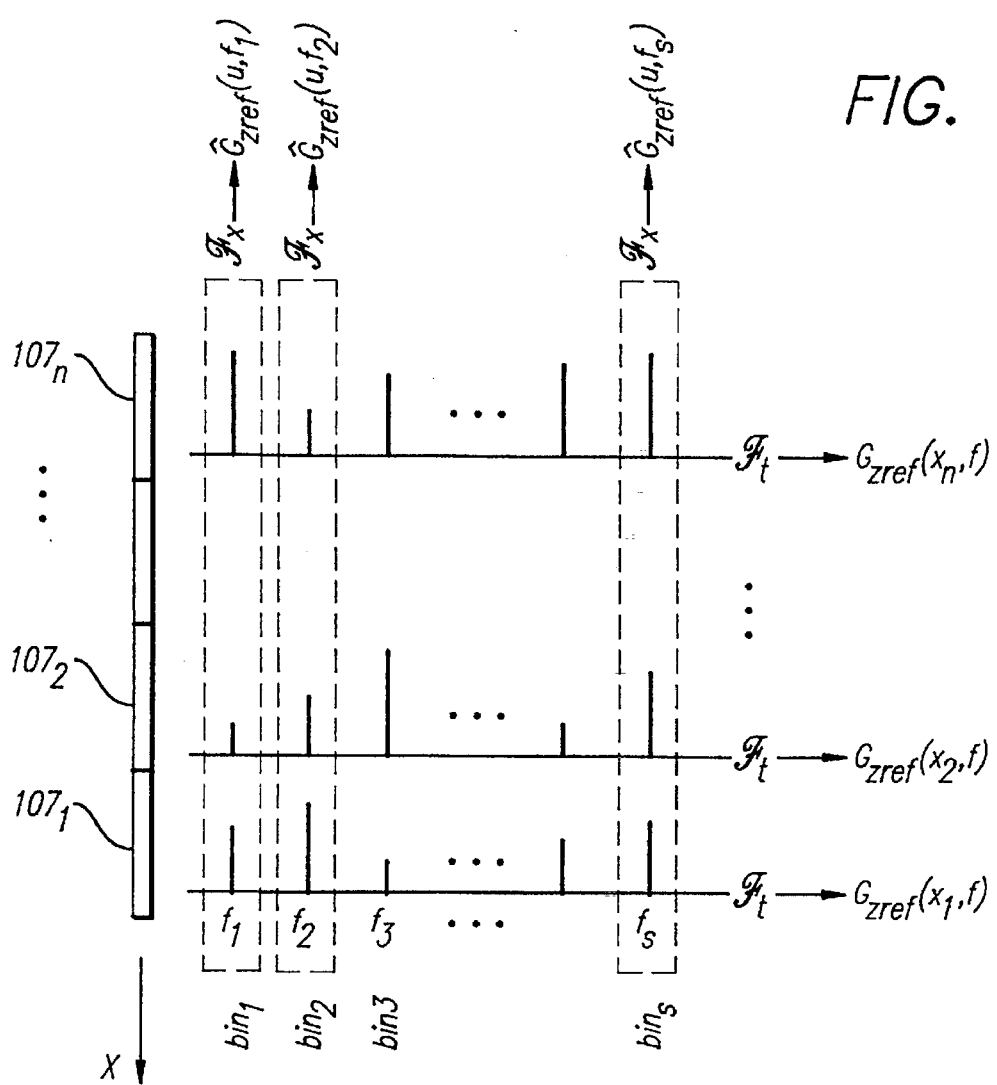
FIG. 3 illustrates the way in which signals are sequentially grouped and transformed according to the invention.

See both FIGS. 2 and 3. FIG. 3 illustrates the signal transformations performed by transformation circuits 204 and 206. When the time-domain signal from element $107_1$ is transformed from the time to the frequency domain by the circuit 204 ($\Im_t$), the resulting signal contains complex amplitude values for each of the s frequencies $f_1, f_2, \ldots, f_s$ in respective bins $bin_1, bin_2, \ldots, bin_s$. The same is done for each of the n elements. In the illustrated example, the $f_2$ component is stronger than the $f_3$ component for element $107_1$, but is weaker for element $107_2$.

The n frequency values (one for each element) in each bin are then grouped and transformed by the spatial Fourier transformation circuit 206 ($\Im_x$) to form the respective decomposition signals $\hat{G}_{zref}(u,f)$. For example, the $f_1$ components for elements $107_1, 107_2, \ldots, 107_n$ are used as the input values to circuit 206 ($\Im_x$), which then generates $\hat{G}_{zref}(u,f_1)$. This is repeated for the $f_2$ components in bin2, and so on for each bin.

The significance of the decomposition of monochromatic, planar wave signals such as $\hat{G}_{zref}(u,f)$ is best understood with reference to the theory of the angular spectrum of plane waves, which is discussed (in the context of optics) in detail in *Introduction to Fourier Optics*, Joseph Goodman, McGraw-Hill Publishing Co., pp. 48–56. In the context of this invention, however, FIG. 4 is a very simplified illustration of the theory.

Figure 4:
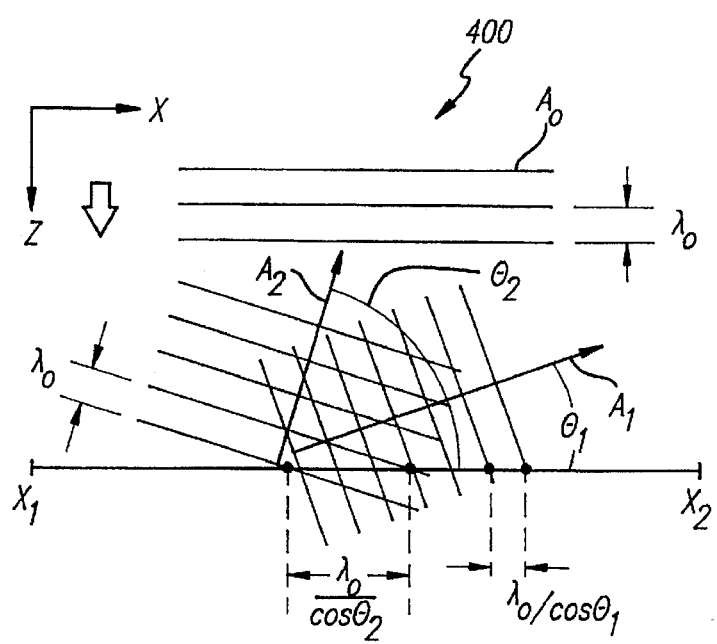
FIG. 4 illustrates angular spectral decomposition of a signal, which is used in the invention.

FIG. 4 shows a monochromatic (single-frequency) planar wave 400 (for example, any of the signals $\hat{G}_{zref}(u,f)$) that is propagating in a positive z-direction (as defined by the illustrated x-z axes) toward a plane 402, with an incident wavelength $\lambda_0$ and amplitude $A_0$. Note that it simplifies analysis if the direction of propagation of the planar wave 400 is perpendicular to the plane 402, but that this is not necessary to apply the theory.

According to the theory of angular spectral decomposition of a monochromatic wave, an arbitrary monochromatic wave can be decomposed into a set of waves that, in general, each have the same wavelength as the initial wave, but that have different amplitudes and angles of incidence. In FIG. 4, two such waves are shown, with respective amplitudes $A_1$, $A_2$, and angles of incidence (relative to the normal to the respective wavefront) $\theta_1, \theta_2$ (equivalent to spatial frequencies $u_1$ and $u_2$).

Note that the spacing between same-phase points of each wave on the line 402 increases as the inverse of the cosine of the angle of incidence increases. The spatial frequencies $u_i$ are then defined as: $u_i = 2\pi \cos(\theta_i)/\lambda_0$ Perfect decomposition would in most cases require an infinite number of angular spectral waves, not just the two shown in the figure. The accuracy of the decomposition is, however, in almost all practical cases a question of how many waves one chooses to include in the representation. The spatial Fourier transformation provides this decomposition.

Note that the common time-to-frequency Fourier transformation ($\Im_t$), in which the variable $\alpha$ of Equations 1 and 2 is time t, decomposes a time-varying signal, measured between beginning and end times $t_1, t_s$, into a set of frequencies, amplitudes and phases. The spatial Fourier transformation ($\Im_x$), in which the variable $\alpha$ (and, for the two-dimensional case, $\beta$ as well) of Equations 1 and 2 is spatial, decomposes a mono-chromatic signal, measured between end points $x_1, x_2$ (and between points in an orthogonal, y-direction in the 2-D case), into a set of frequencies, amplitudes and angles. An n-point (or, in the 3-D case, with a 2-D array, an m×n-point) spatial Fourier transformation therefore decomposes the already time-to-frequency transformed signal $G_{zref}(x,f)$ into an angular spectrum with the same number of frequencies. FIG. 4 illustrates the angular spectral decomposition approach.

The usefulness of angular spectrum decomposition in the invention can be understood better by considering a very simplified analogy to the triangulation scanning techniques used in x-ray based computer tomography (CT). In such imaging technologies, an x-ray beam is directed through the interrogation region from a first angle, and the degree of attenuation is registered on the opposing side of the region. No x-ray "echoes" are measured, since the x-rays pass through the region substantially without reflection. X-rays are then directed into the same region from a different angle (for example, by rotating the gantry that holds the accelerator that produces the x-rays), attenuation is once again measured, and so on, for many different angles. Even given two beams from different angles, it is possible to locate structures very precisely, using simple triangulation. (The structures are at the well-defined regions of intersection of the various beams.)

Beams of ultrasound, however, do not pass easily through the human body, but rather are reflected back toward the transducer from the structures of the interrogation region, and are quickly attenuated otherwise. Furthermore, the exact position of the transducer relative to the interrogation region is either not known, or requires special calibrated holding brackets or position sensors for the transducer probe. Moreover, to scan the interrogation region enough times to generate a proper image, especially 3-D, would take too long.

As FIG. 4 illustrates, however, by employing angular spectral decomposition, the interrogation signal 400 is analyzed and processed as if it were the set of n (or, in the 3-D case, m×n) waves coming from various angles $\theta_1, \theta_2$, and so on. In other words, the invention analyzes the decomposed signal returned to the transducer as if it consisted of several signals from different angles. These components pass through substantially all of the interrogation region, so that an image of the entire region can be built up from the return signal from a single transmitted ultrasound pulse.

Refer once again to FIG. 2. The next sub-process in the invention is carried out by a propagation processor 208, which forms a propagated decomposition signal $\hat{G}_z(u,f)$ according to the following:

$$\hat{G}_z(u,f_j) = e^{i\lambda(z_{ref}-z)} \cdot \hat{G}_{zref}(u,f_j)$$

where:

$e^{i\lambda(z_{ref}-z)}$ is a propagation or phase factor, $\gamma_j = (k_j^2 - u^2)$ for 2-D images; and $\gamma_j = (k_j^2 - u^2 - v^2)$ for 3-D images, in which case $\hat{G}_z$ and $\hat{G}_{zref}$ are functions of the second spatial variable v(y);

$k_j = 2\pi/\lambda_j$ where $\lambda_j$ is the wavelength of the monochromatic wave (with frequency $f_j$) that is being decomposed.

One effect of the propagation factor is to correct for any diffraction of the beam. Another effect is to produce the angular spectral information (the function $\hat{G}_z$ for the plane or, in the 2-D case, the line at depth z) from the angular spectral information for the reference plane at $z=z_{ref}$, which is contained in the function $\hat{G}_{zref}$. Note that z does not necessarily have to lie between z=ef and the plane of the transducer at $z=z_0=0$. Rather, by changing the propagation factor (the value of z), one can derive the angular spectral information for the corresponding depth z. Note that the use of the term "back-propagation processor" 116 (FIG. 1) does not indicate a limitation to any particular direction of propagation of the ultrasound itself, but rather is used in the sense of synthesizing the image data for one region (plane) based on image data from another region (the reference plane).

In FIG. 2, and in this discussion so far, the position of the reference plane (illustrated at $z_{ref}=z_2$) has been left undetermined for the sake of illustrating the generality of the invention. It will usually not be possible, however, to sense the actual acoustic signal within the interrogation region, since this lies within the patient's body. On the other hand, the system will have information for the actual return signal at $z=z_0=0$, since this is the transducer plane itself. Accordingly, the invention preferably uses the transducer plane itself as the reference plane, that is, $z_{ref}=0$.

Note that the interrogation region will normally not begin at a depth of $z=0$, but rather at some depth $z=z_1$. (The structure of interest lies beneath the skin against which the transducer is held.) By varying z to depth values throughout the interrogation region, the invention is thus able to derive, or rather, reconstruct, the angular spectral information for any chosen plane (or, in the case of 2-D images, line) by "sweeping" z from $z=z_1$, in predetermined increments, to a predefined maximum depth $Z_{max}$ of the interrogation region, over the entire interrogation region. The number of increments will depend on the available processing speed and can be chosen by experimentation and calculation: the finer the increments, the better the resolution, but the greater the computational burden. The invention can thus generate the propagated angular spectral decomposition signals $\hat{G}_z(u,f)$ for all values of z in the interrogation region based on the return signal from only a single transmitted pulse.

The invention next applies all of the propagated angular spectral decomposition signals $\hat{G}_z(u,f)$ individually to an inverse spatial Fourier transformation ($\mathfrak{S}_u^{-1}$) circuit 212. Inverse Fourier transformation is well understood, and is described in Equations 3 and 4. The output of this processor, for every input signal, is a corresponding set of (complex) frequency signals $G_z(x,f)$, which are analogous to the signals $G_{zref}(x,f)$ but for all depths z such that $z_1 \leq z < z_{max}$.

The invention then transforms each $G_z(x,f)$ using an inverse temporal Fourier transformation ($\mathfrak{S}_f^{-1}$) circuit 214 to produce time-domain, propagated image signals $g_z(x,t)$, which are analogous to the return signals $g_{zref}(x,t)$ but for all depths z such that $z_1 \leq z \leq z_{max}$. See FIGS. 1 and 2. These propagated image signals $g_z(x,t)$ are time-domain brightness (echo strength) signals, which can then be applied in the conventional manner to the reception controller 115, processing system 102 (see FIG. 1), for example, for post-processing and filtering such as speckle reduction, edge detection, or other contrast improvement. After such conventional filtering, the image signals are applied to the display driver 120 and may be displayed to the user in any known way.

As FIG. 1 indicates, the memory 118 preferably stores the time-domain return signals $g_{zref}(x,t)$, as well as the various transformed signals $G_{zref}(x,f)$, $\hat{G}_{zref}(u,f)$, $\hat{G}_z(u,f)$, $G_z(x,f)$ and $g_z(x,t)$. Note that it will in general not be necessary to store $\hat{G}_z(u,f)$, $G_z(x,f)$ for all propagated depths z, but rather only for one depth at a time, and only long enough to generate the propagated image signals $g_z(x,t)$ for that depth. Storing only the current signals $\hat{G}_z(u,f)$, $G_z(x,f)$ thus reduces the memory requirements of the system.

The propagated image signals $g_z(x,t)$, however, are preferably stored for all depths. While viewing the screen 126, the user can then maneuver the control device 101 in any known way in order to direct the processing system 102 and display driver 125 to select which 2-D cross section (that is, set of signals $g_z(x,t)$) in the 3-D interrogation volume the system is to display.

The invention includes four main processing steps involving Fourier transformation ($\mathfrak{S}_t$, $\mathfrak{S}_x$, $\mathfrak{S}_u^{-1}$, and $\mathfrak{S}_f^{-1}$). Since the number of transducer elements 117 in any direction is typically a power of two, such as 128 for a linear array or 64×128 or 128×128 for a 2-D array, Fast Fourier Transform (FFT) techniques are preferable because of their computational efficiency and speed. Any or all of the transformation processors 204, 206, 208, 212, 214 may be implemented using either high-speed, dedicated digital signal processors or as a single transformation processing system (even as a part of the processing system 102) provided the single system is able to perform the various calculations fast enough to provide a 3-D image before the user must move the probe to another interrogation region. Note that one other advantage of the invention is that diffraction effects are "built into" the transformations, so that the invention, unlike known devices, does not need to include specialized hardware or software for diffraction compensation.

As FIG. 1 illustrates, in some applications, $g_{zref}(x,t)$ will be only a subset of the stored image data 120. For example, the invention may be part of a system that operates in both B-mode and Doppler mode, so that the system would also store Doppler data in the memory portion 120. One advantage of the invention is that it is so fast in generating 3-D data that switching between such different modes will often be possible without loss of speed.

Again, note that the invention is able to provide image data for an entire interrogation region based on the return signals from only a single transmitted pulse of ultrasound: Using a 1-D, n-element linear array, an entire image plane can be reconstructed and using a 2-D, m×n-element array, an entire image volume can be reconstructed.

In certain applications, the great speed made possible by the invention may not be fully needed. In such cases, the system may transmit and process multiple pulses into the same interrogation region, transform and propagate each return signal as $g_{ref}$ and form respective sets of 3-D (or 2-D, depending on the array used) image data $g_z(x,t)$. These multiple 3-D images can then be registered and averaged (weighted, if appropriate) in order to improve the signal-to-noise ratio of the system. Even in such cases, and even with four to five, or as many as ten multiple, averaged images, however, the invention will normally operate at least an order of magnitude faster than known systems for creating planar images, and two to three orders of magnitude faster that systems for creating 3-D volume images.

The trade-off between processing speed on the one hand and degree of repetition and averaging on the other hand will depend on how fast the various processing systems are in any given implementation, as well as on what other tasks they must perform (for example, Doppler mode imaging in addition to B- or brightness mode). The user will be able to determine in any known way how much, if any, pulse repetition and averaging she wants, for example, by entering this parameter into the processing system 102 via the input unit 100.

I claim:

1. A method for imaging an interrogation region of a patient's body using ultrasound comprising the following steps:

generating a single pulse of ultrasound by activating a plurality of transducer elements in an ultrasound transducer and directing the pulse into the interrogation region;

at a reference plane, sensing a time-domain reference return signal that includes back-scattered ultrasound from the interrogation region;

generating a temporal and a spatial decomposition of the reference return signal;

generating an image of the entire interrogation region of as a predetermined function of the temporal and spatial decompositions of the reference return signal; and displaying the image.

2. A method as defined in claim 1, in which the step of generating the image further comprises the following sub-steps:

transforming the time-domain reference return signal into the frequency domain as a frequency-domain reference signal by generating the temporal decomposition of the reference return signal;

decomposing the frequency-domain reference signal into an angular spectrum as a decomposed reference signal;

propagating the decomposed reference signal to at least one additional plane other than the reference plane and thereby forming, for each additional plane, a respective decomposed propagated signal;

inverse transforming each decomposed propagated signal into a corresponding frequency-domain propagated signal;

inverse transforming each frequency-domain propagated signal into the time domain as a corresponding time-domain propagated signal;

converting each time-domain propagated signal into a set of partial image values corresponding to their respective additional planes; and compiling the partial image values into the image.

3. A method as defined in claim 2, in which the step of propagating the decomposed reference signal comprises, for each additional plane, multiplying the decomposed reference signal by a predetermined function of the distance between the reference plane and the respective additional plane.

4. A method as defined in claim 2, further comprising:

performing a plurality of times the steps of generating a pulse of ultrasound, sensing the time-domain reference return signal, and generating the image of the entire interrogation region; and averaging the generated images as a composite image, which is then displayed.

5. A method as defined in claim 2, in which:

the step of generating the pulse of ultrasound comprises generating the pulse as a planar wave; and the image is generated as a three-dimensional image.

6. A method as defined in claim 2, in which the transducer has a transducer plane, and the reference plane is the transducer plane.

7. A method as defined in claim 2, in which all transducer elements are activated uniformly by a nonbeam-formed activation signal.

8. A method for imaging an interrogation region of a patient's body using ultrasound comprising the following steps:

A) generating a pulse of ultrasound by uniformly activating a plurality of transducer elements in a two-dimensional ultrasound transducer, which has a transducer plane, and directing the pulse into the interrogation region;

B) selecting the transducer plane as a reference plane;

C) at the reference plane, sensing a time-domain reference return signal that includes back-scattered ultrasound from the interrogation region;

D) generating an image of the entire interrogation region as a predetermined function of the reference return signal, including the following sub-steps:

1) transforming the time-domain reference return signal into the frequency domain as a frequency-domain reference signal by decomposing the reference return signal into a frequency spectrum;

2) decomposing the frequency-domain reference signal into an angular spectrum as a decomposed reference signal;

3) propagating the decomposed reference signal to at least one additional plane other than the reference plane by multiplying the decomposed reference signal by a predetermined function of the distance between the reference plane and the respective additional plane, thereby forming, for each additional plane, a respective decomposed propagated signal;

4) inverse transforming each decomposed propagated signal into a corresponding frequency-domain propagated signal;

5) inverse transforming each frequency-domain propagated signal into the time domain as a corresponding time-domain propagated signal; and 6) converting each time-domain propagated signal into a set of partial image values corresponding to their respective additional planes;

E) compiling the partial image values into a three-dimensional image; and

F) displaying a selected portion of the three-dimensional image.

9. A system for imaging an interrogation region of a patient's body using ultrasound comprising:

an ultrasound transducer that includes a plurality of transducer elements;

transmission control means for activating the transducer for generating a single pulse of ultrasound and directing the pulse into the interrogation region, the transducer sensing, at a reference plane, a time-domain reference return signal that includes back-scattered ultrasound from the interrogation region;

back-propagation processing means for generating an image of the entire interrogation region as a predetermined function of a temporal and a spatial decomposition of the reference return signal; and display means for displaying the image.

10. A system as defined in claim 9, in which the back-propagation processing means includes:

time-domain transformation means for decomposing the reference return signal into a frequency spectrum, and thereby for transforming the time-domain reference return signal into the frequency domain as a frequency-domain reference signal;

spatial transformation means for decomposing the frequency-domain reference signal into an angular spectrum as a decomposed reference signal;

propagation means for propagating the decomposed reference signal to at least one additional plane other than the reference plane to form, for each additional plane, a respective decomposed propagated signal;

inverse spatial transformation means for transforming each decomposed propagated signal into a corresponding frequency-domain propagated signal;

inverse time-domain transformation means for transforming each frequency-domain propagated signal into the time domain as a corresponding time-domain propagated signal;

conversion processing means for converting each time-domain propagated signal into a set of partial image values corresponding to their respective additional planes and for compiling the partial image values into the image.

* * * * *